United States Patent
Poarch et al.

(10) Patent No.: US 6,832,544 B2
(45) Date of Patent: Dec. 21, 2004

(54) PORTABLE SANDWICH PREPARATION APPARATUS

(76) Inventors: Michael J. Poarch, deceased, late of Redmond, OR (US); by Vickie L. Poarch, legal representative, 858 NE. Nickernut Ave., Redmond, OR (US) 97756

(*) Notice: Subject to any disclaimer, the term of this patent is extended or adjusted under 35 U.S.C. 154(b) by 243 days.

(21) Appl. No.: 10/160,876

(22) Filed: May 30, 2002

(65) Prior Publication Data

US 2002/0178977 A1 Dec. 5, 2002

Related U.S. Application Data

(60) Provisional application No. 60/294,807, filed on May 31, 2001.

(51) Int. Cl.$^7$ .............................. A23P 1/00; A21C 9/04
(52) U.S. Cl. .......................... 99/450.5; 99/441; 99/448; 211/85.4
(58) Field of Search ........................ 99/441, 426, 448, 99/449, 450.4, 450.5; 211/41.2, 60.1, 126.1, 85.4, 85.18; 220/912, 574, 575

(56) References Cited

U.S. PATENT DOCUMENTS 2,741,901 A * 4/1956 Silos .......................... 211/85.4
3,994,213 A * 11/1976 Brezinski ...................... 99/441

* cited by examiner

Primary Examiner—Reginald L. Alexander
(74) Attorney, Agent, or Firm—Olson & Olson

(57) ABSTRACT

A sandwich preparation apparatus mounts a plurality of sandwich holder members arranged to receive, support and retain a sandwich in a partially open, generally upright condition for convenient filling with various, desired food ingredients and condiments, each of the plurality of sandwich holder members having an order card holder associated therewith for identifying each particular sandwich being prepared so that identification of each one of different multiple sandwiches is maintained throughout their concurrent preparation and as the apparatus is carried from place to place about a sandwich preparation area during the preparation of the sandwiches. After a sandwich is completed, an opened sandwich bag may be placed over the end portion of a sandwich holder member and a sandwich supported thereon simply pushed, in sliding fashion directly into the bag which may be given to a customer as a completed, packaged sandwich product.

3 Claims, 3 Drawing Sheets

PORTABLE SANDWICH PREPARATION APPARATUS

This application claims benefit under 35 U.S.C. 119(e) of the priority filing date of earlier filed U.S. Provisional application Ser. No. 60/294,807, filed May 31, 2001.

BACKGROUND OF THE INVENTION

This invention relates to devices used to support sandwiches in a stable and suitable condition during their preparation prior to their delivery to a purchaser after the sandwich has been completed according to the purchaser's order.

As is known by those in the food service industry, hot dogs, "submarine" sandwiches, "pocket" sandwiches and other types of sandwiches are filled with many various different ingredients and condiments according to the particular type of sandwich ordered and often further varied according to the individual customer's preferences. Not surprisingly therefore sandwiches of these type almost invariably are made individually since confusion between similarly-appearing, partially-prepared sandwiches can easily occur, particularly when the sandwiches are typically simply laid out on a counter during preparation and necessarily being moved and carried from place to place where various different ingredients and condiments are located.

Another common preparation technique often employed by sandwich preparers involves the holding of an open bun or sandwich shell in one hand while filling and arranging ingredients therein using the other hand. As can be easily appreciated especially by those who work in sandwich shops, hot dog eateries and the like, carrying and bagging these usually well-stuffed type of sandwiches can be extremely awkward since they are filled with and usually virtually "overflowing" with many loose ingredients and frequently hot and "sloppy" ingredients as well.

SUMMARY OF THE INVENTION

In its basic concept this invention provides a sandwich preparation apparatus having at least one sandwich support member arranged to receive and support a bun, loaf or other sandwich type shell in a stable, at least partly open, generally upwardly facing condition during filling with ingredients and condiments.

It is by virtue of the foregoing basic concept that the principal objective of this invention is achieved; namely, the provision of a sandwich holding apparatus that facilitates the preparation of various types of sandwiches and reduces the physical handling of the sandwich by the preparer.

Another object of this invention is the provision of a sandwich preparation apparatus of the class described which may be arranged to be lifted and carried about while supporting sandwiches in the process of being prepared.

Another object of this invention is the provision of a sandwich preparation apparatus of the class described which includes a plurality of sandwich support members for holding a plurality of sandwiches during their preparation and order card holders are associated with each said sandwich support member to receive and display the order particulars of a sandwich on a corresponding support to allow for the concurrent preparation of multiple sandwiches without confusion therebetween.

Yet another object of this invention is the provision of a sandwich preparation apparatus of the class described which is further arranged to facilitate the bagging of finished sandwiches with minimum physical handling of the sandwich by the preparer.

A further object of this invention is the provision of a sandwich preparation apparatus of the class described which may also be arranged to carry sandwich wrap bags, napkins and other items to be included with the finished sandwich during bagging prior to delivery to a customer.

A still further object of this invention is the provision of a sandwich preparation apparatus of the class described which is of simplified construction for economical manufacture.

The foregoing and other objects and advantages of this invention will appear from the following detailed description, taken in connection with the accompanying drawings of a preferred embodiment.

DESCRIPTION OF THE PREFERRED EMBODIMENTS

Figure 1:
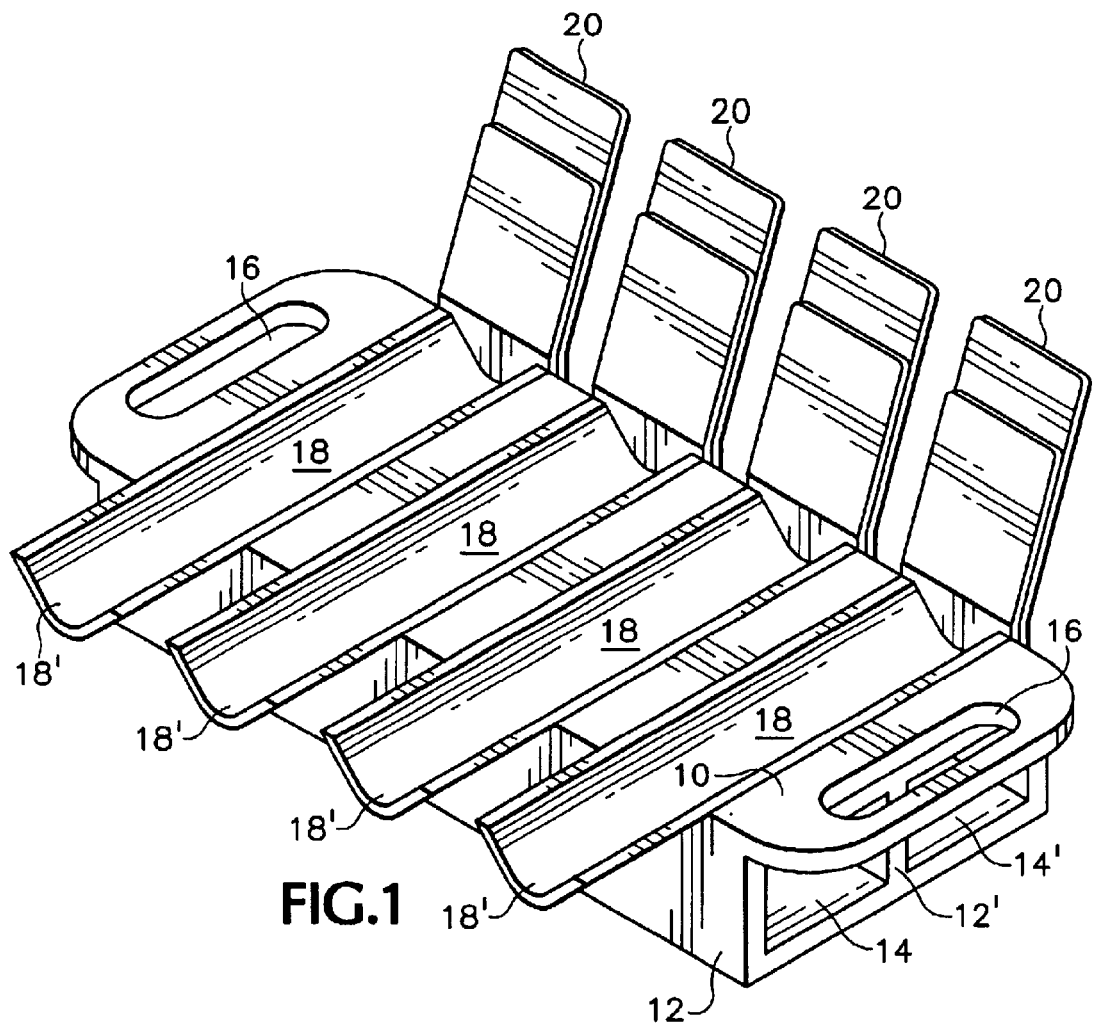
FIG. 1 is a perspective view of a sandwich preparation apparatus embodying features of this invention.

A preferred form of a sandwich preparation apparatus embodying features of this invention is shown in FIGS. 1–5 wherein the apparatus comprises a base frame member configured herein as a substantially rectangular top base member 10 having support thereon for releasably engaging a supporting structure to securely support the top base member thereon. In the preferred embodiment illustrated herein, the top base member 10 mounts an underlying base support structure 12 configured to support the top base member a spaced distance above an underlying supporting surface such as a work counter or table for example.

In the embodiment illustrated the support base structure is formed as a substantially hollow box member having internal partition walls 12' arranged to form storage bins 14, 14' within the hollow interior of the box member, the bins for holding such things as sandwich wrap bags or wrappers, napkins, etc. (not shown). Alternatively, the base support structure may, if desired, be configured simply as downwardly projecting leg or feet members (not shown) arranged to simply support the top base member 10 on an underlying surface such as a counter or table.

The top base member 10 may also as illustrated include lifting and carrying handles 16 to facilitate the secure carrying of the assembly by a sandwich preparer as may be needed or desired during the process of preparing sandwiches thereon. Sandwich holder means is provided for supporting at least one sandwich during its preparation. In the embodiment shown, the top base member mounts a plurality of sandwich support members which are configured to support and hold a desired sandwich loaf, bun or other sandwich shell in a generally open, generally upwardly-facing, stable condition for facilitated filling of the sandwich with desired ingredients and condiments. In the apparatus illustrated the sandwich support members, troughs 18 in this case, are particularly configured to support elongated types of sandwiches such as hot dogs and submarine-type sandwiches (not shown). Other sandwich support member configuration may be provided as needed for supporting different sandwich shell types.

Figure 2:
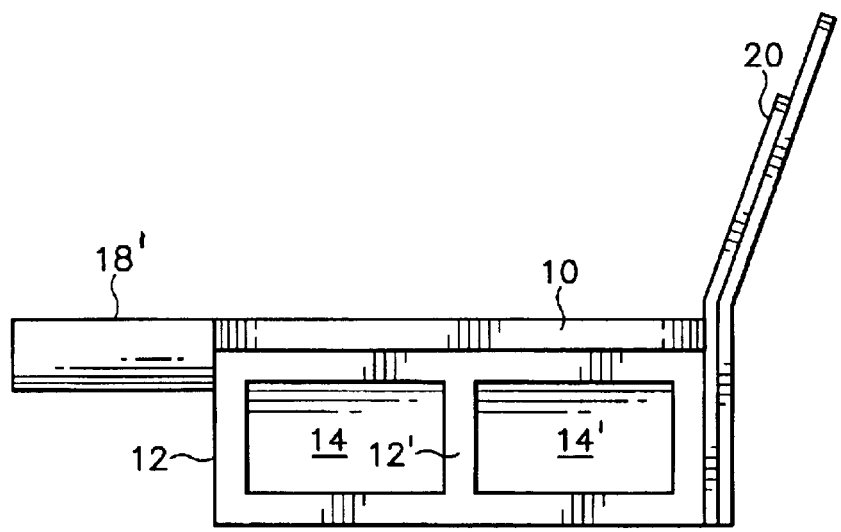
FIG. 2 is an end view of the apparatus of FIG. 1 as viewed from the lower right in FIG. 1.
Figure 3:
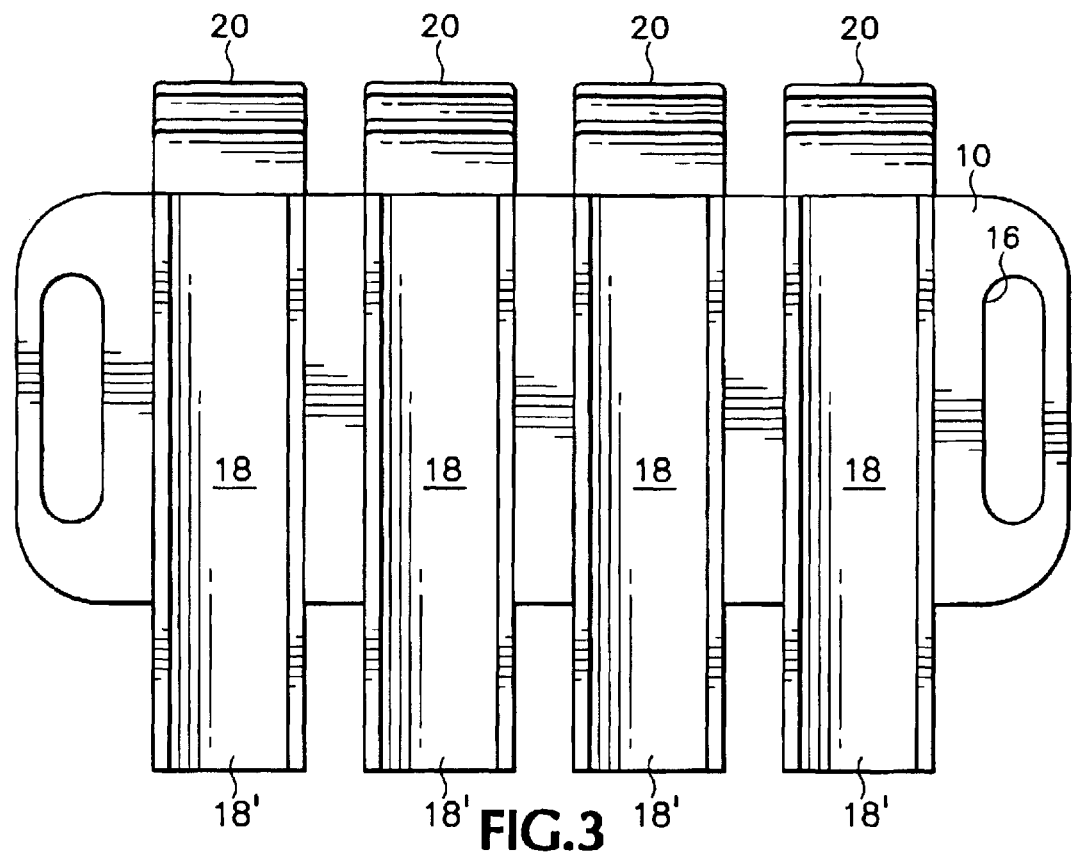
FIG. 3 is a top plan view of the apparatus of FIG. 1.
Figure 4:
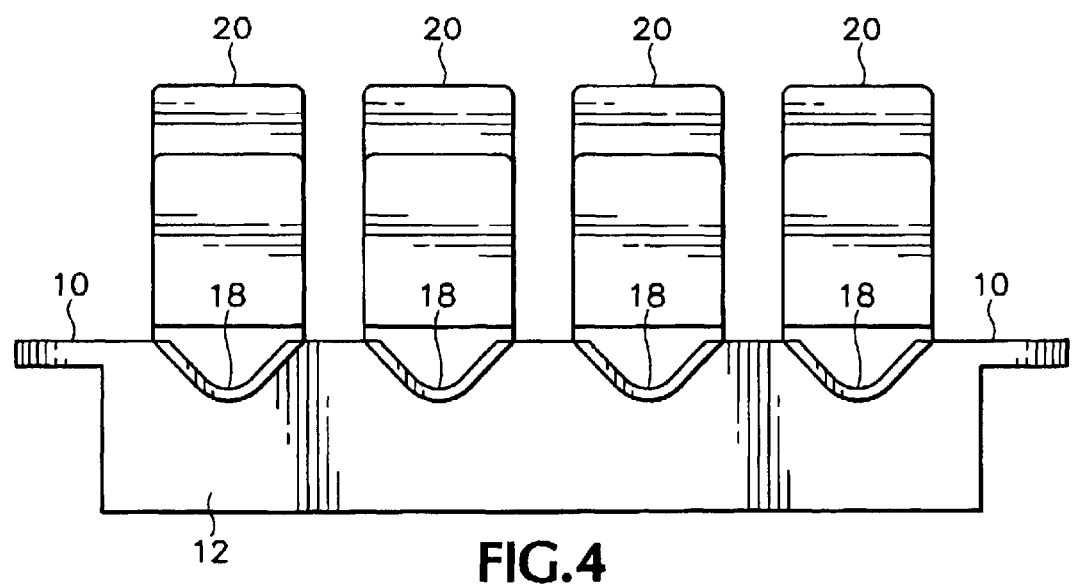
FIG. 4 is a front elevation of the apparatus as viewed from the lower left in FIG. 1.
Figure 5:
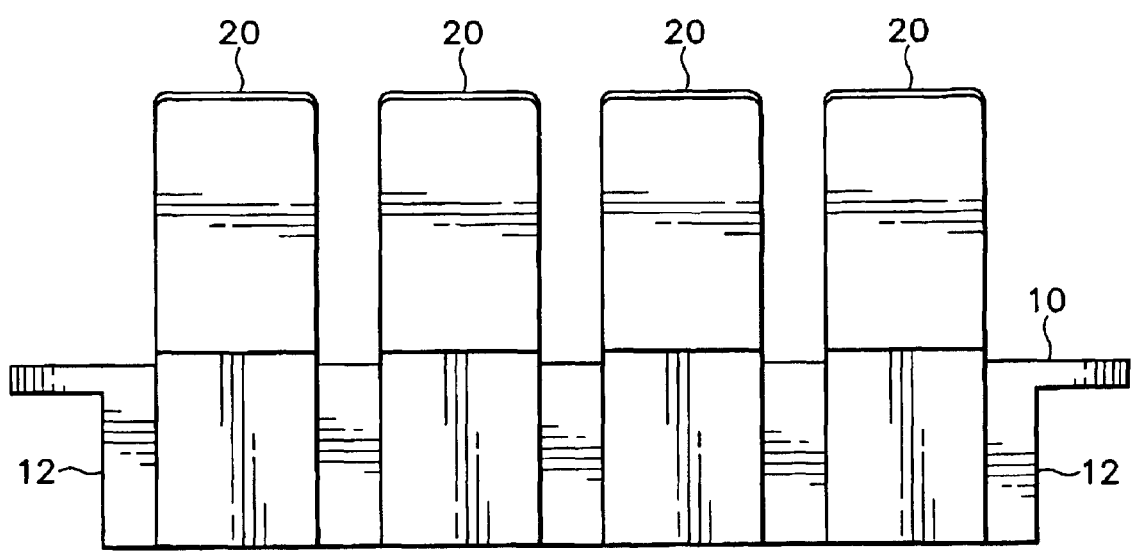
FIG. 5 is a rear elevation of the apparatus as viewed from the opposite side in FIG. 4.

As seen best in FIGS. 1, 2 and 3 of the drawings, each trough 18 has a front terminal end portion 18' that is configured to project a spaced distance beyond the leading edge of the supporting base member 10 for purposes which will be explained. Mounted on the top base member adjacent the opposite, rear end of each trough member 18 is an upstanding order card holder 20 configured to receive and frictionally hold and display an order card (not shown) which identifies the particulars type of the sandwich being made in each of the corresponding troughs 18. In this manner, a plurality of different sandwiches may be made concurrently without confusion because each sandwich remains aligned at all times with its corresponding order card. The entire assembly may also be picked up and carried from location to location about a sandwich preparation workplace where different condiments and ingredients may be obtained and placed into the sandwich, still with each individual sandwich being identified continuously.

When a sandwich is completed, a sandwich bag (not shown) may be withdrawn from one of the bins 14, 14', opened, and then the opened end of the bag inserted over the projecting terminal end 18' of a trough 18 with the projecting end 18' extending into the bag which is simply held thereon as the completed sandwich is simply pushed axially along the trough and into the bag. The bag is then removed from the end 18' of the trough, closed and given to the customer as a finished, packaged product. The order card is also removed from the order holder 20 which is then ready to receive another order.

From the foregoing it will be apparent to those skilled in the art that the present invention not only provides a device which is arranged to support at least one sandwich in a stable, generally open, generally upright condition convenient for filling with ingredients and condiments, but also provides a structure which permits the sandwiches to be carried in a very stable and secure filling condition during their preparation as needed to obtain the various ingredients necessary to the preparation of the sandwich. Moreover, the invention also provides for the facilitated packaging of the completed sandwich after it is completed, requiring only an absolute minimum of physical handling by the sandwich preparer during the bagging process. It will also be appreciated by those skilled in the art that the apparatus of this invention may easily be cleaned of any spilled food ingredients, etc. by a simple wipe with a cloth or the like.

It will further be apparent to those skilled in the art that many various changes other than those already discussed hereinbefore may be made in the size, type, number and arrangement of parts described hereinbefore without departing from the spirit of this invention and the scope of the appended claims.

Having thus described our invention and the manner in which it may be used, we claim:

1. A sandwich preparation apparatus for facilitating the preparation of sandwiches including, but not limited to hot dogs, and "submarine" type and "pocket" type sandwiches, the sandwich preparation apparatus comprising:

a) a base member, b) a plurality of sandwich support members on said base member, each sandwich support member configured to receive, support and retain a sandwich in at least partially open, generally upwardly-facing, stable condition on said base member for the placement of food ingredients and condiments into the supported sandwich during its preparation, and c) a plurality of order holders on the base member, one associated with each said sandwich support member to removably hold and display preparation details for a sandwich positioned on the corresponding sandwich support member whereby to assure the correct identification and preparation of each of a plurality of concurrently prepared sandwiches supported on the base member.

2. The sandwich preparation apparatus of claim 1 wherein each of said sandwich support members is configured to supportively receive the open end of an opened sandwich bag with said sandwich support member extending partially into an open bag for manual, sliding movement of a prepared sandwich supported on the support member directly into a sandwich bag for subsequent delivery of the bagged sandwich to a customer.

3. The sandwich preparation apparatus of claim 1 including means for lifting and carrying the apparatus with sandwiches supported thereon retained in said at least partially open, generally upwardly-facing, secure preparation condition during lifting and carrying of the apparatus.

* * * * *